United States Patent [19]
Tokuda

[11] Patent Number: 5,703,673
[45] Date of Patent: Dec. 30, 1997

[54] METHOD OF AND APPARATUS FOR INPUTTING PHOTOGRAPHIC INFORMATION, CAMERA, AND METHOD OF AND APPARATUS FOR PRINTING PHOTOGRAPHIC INFORMATION

[75] Inventor: Kanji Tokuda, Kanagawa, Japan

[73] Assignee: Fuji Photo Film Co., Ltd., Kanagawa, Japan

[21] Appl. No.: 451,567

[22] Filed: May 26, 1995

[30] Foreign Application Priority Data

Jul. 4, 1994 [JP] Japan ................................ 6-152206

[51] Int. Cl.$^6$ ............................................. G03B 17/24
[52] U.S. Cl. ............................ 355/40; 355/39; 355/42; 355/77; 396/310
[58] Field of Search ........................... 355/39, 40, 42, 355/77; 396/310, 311, 319

[56] References Cited

U.S. PATENT DOCUMENTS 5,579,067  11/1996  Wakabayashi ..................... 396/311

Primary Examiner—R. L. Moses
Assistant Examiner—Shival Virmani
Attorney, Agent, or Firm—Sughrue, Mion, Zinn, Macpeak & Seas, PLLC

[57] ABSTRACT

When images are photographed by using a photographic film at which a magnetic recording layer is provided, photographic information regarding the entire film and photographic information regarding respective image frames can be magnetically recorded. A method and an apparatus are provided for the recording or for printing the photographic information which is magnetically recorded. In a case in which a printing area is limited, magnetically-recording of or printing of non-prior information is limited so that prior information is printed on the printing area prior to the non-prior information. For example, the information regarding an image frame is printed on the printing area of the back surface of the photographic printing paper prior to the information regarding the entire film.

12 Claims, 4 Drawing Sheets

METHOD OF AND APPARATUS FOR INPUTTING PHOTOGRAPHIC INFORMATION, CAMERA, AND METHOD OF AND APPARATUS FOR PRINTING PHOTOGRAPHIC INFORMATION

BACKGROUND OF THE INVENTION

1. Field of the Invention

The present invention relates to a method of and an apparatus for inputting photographic information in which, when images are photographed by using a photographic film at which a magnetic recording layer is provided, photographic information of the entire photographic film and respective image frames can be magnetically recorded. Further, the present invention relates to a camera in which the apparatus for inputting photographic information is loaded, and moreover, to a method of and an apparatus for printing photographic information in which the magnetically-recorded photographic information is read so as to be printed on a predetermined recording medium.

2. Description of the Related Art

Conventionally, depending on the type of a camera, dates and simple characters can be printed on a 135 mm negative film or the like at the same time that images are photographed.

However, even if a user (a photographer) wants to give a title to an image to be photographed (e.g., a title regarding the place in which the image is photographed or the impression at the time when the image is photographed) and wants to record the title as information in detail, an amount of information which can be inputted into the above-described negative film is greatly limited so that he/she may not be satisfied with the result.

Accordingly, in recent years, a negative film having a magnetic recording layer, onto which the information can be magnetically recorded, has been proposed. Since the photographic information is magnetically recorded onto the negative film, a lot of information can be written on a narrow space thereof, and therefore, most of the photographic information the user wants to leave can be recorded.

When images are printed on a photographic printing paper, the recorded photographic information (title) can be read and thereafter printed on, for example, the back surface of the photographic printing paper. Accordingly, the information when the images printed on the photographic printing paper had been photographed can be kept as a record.

The photographic information includes information regarding one negative film and information regarding respective image frames. Methods of recording the photographic information are used in which the user records the photographic information by selecting it from set phrases memorized and stored in advance in a camera, and in which the user records the information by forming his/her own phrase by inputting the individual characters of the phrase one by one. The following four cases or items are thereby raised.

A. A case in which the information relating to one negative film is selected from set phrases (a user selecting film title).
B. A case in which a phrase of the information relating to one negative film is formed by inputting the individual characters of the phrase one by one (a user inputting film title).
C. A case in which the information relating to respective image frames is selected from the set phrases (a user selecting frame title).
D. A case in which phrases of the information relating to respective image frames are formed by inputting the individual characters of the phrases one by one (a user inputting frame title).

However, even if all of the above-described four titles are magnetically recorded onto the magnetic recording layer, all of them cannot be printed, in a case in which the printing area of the back surface of the photographic printing paper is narrow. In addition, even if a film title is inputted, all of the images do not necessarily correspond to the film title. For example, a user may buy a negative film having 24 frames, input (or select) "at a trip to . . . " as a film title, and take the first 15 pictures at places he/she travels and the rest of the film at home.

Further, in a case in which all of magnetically-recorded titles are printed, errors may occur because a user may erroneously input characters (in the above-described cases B and D). In this case, a request of adding or correcting characters later on cannot be met.

Therefore, an object of the present invention is to obtain a method of and an apparatus for inputting photographic information in which the amount of magnetically-recorded information can be limited.

Further, another object of the present invention is to obtain a camera in which photographic information can be accessed and edited.

Still another object of the present invention is to obtain a method of and an apparatus for printing photographic information in which, in case of printing on a narrow area, only the minimum information necessary to be printed can be selected from magnetically-recorded information.

SUMMARY OF THE INVENTION

The first aspect of the present invention is a method of inputting photographic information in which, when images are photographed by using a photographic film at which a magnetic recording layer is provided, photographic information regarding the entire photographic film and photographic information regarding respective image frames can be magnetically recorded, and in which by effecting one of a selecting/recording method, in which one of a plurality of set phrases registered in advance is selected and magnetically recorded, and an inputting/recording method, in which a phrase is formed by the manner which involves a user's inputting individual characters of the phrase one by one and magnetically recording, the magnetically-recording by the other method is prohibited.

The second aspect of the present invention is an apparatus for inputting photographic information by which, when images are photographed by using a photographic film at which a magnetic recording layer is provided, photographic information regarding the entire photographic film and photographic information regarding respective image frames can be magnetically recorded, comprising: selecting/recording means in which a plurality of set phrases are registered in advance, for selecting one of the set phrases and magnetically recording; inputting/recording means for forming a phrase by the manner which involves a user's inputting individual characters of the phrase one by one and magnetically recording; and a photographic information recording limiter by which, in a case in which one of the selecting/recording means and the inputting/recording means is selected and the photographic information is recorded, recording by the other means is limited.

The third aspect of the present invention, comprising: an apparatus for inputting photographic information according to the second aspect of the present invention; a memory for memorizing photographic information which is inputted by the apparatus for inputting photographic information; and editing means for accessing and editing the information memorized in the memory.

For example, photographic data including a shutter speed, a value of iris diaphragm, lens data and the type of a film when the images are photographed can be also memorized in the memory.

The fourth aspect of the present invention is a method of printing photographic information, comprising steps of: permitting, when images are photographed by using a photographic film at which a magnetic recording layer is provided, to magnetically record photographic information regarding the entire photographic film and photographic information regarding respective image frames, by any recording method which is selected from a selecting/recording method, in which one of a plurality of set phrases registered in advance is selected and magnetically recorded, and an inputting/recording method, in which a phrase is formed by the manner which involves a user's inputting individual characters of the phrase one by one and magnetically recording; and reading the photographic information magnetically recorded and printing the photographic information on a recording medium, wherein printing of at least one of photographic information regarding the entire photographic film and photographic information regarding the respective image frames is limited.

For example, in a case in which a printing area is limited, the photographic information regarding the above-described respective image frames are printed prior to (i.e., in preference to) the photographic information regarding the entire photographic film described above.

Further, in a case in which a printing area is limited, the phrase formed by inputting the individual characters of the phrase one by one is printed prior to the set phrase registered in advance.

The fifth aspect of the present invention is an apparatus for printing photographic information by which it is permitted, when images are photographed by using a photographic film at which a magnetic recording layer is provided, to record photographic information regarding the entire photographic film and photographic information regarding respective image frames, by selecting from a plurality of set phrases registered in advance and magnetically recording, and to record photographic information regarding the entire photographic film and photographic information regarding respective image frames, by the manner which involves user's inputting individual characters of the phrase one by one and magnetically recording, on a predetermined recording medium, comprising: photographic information reading means for reading the photographic information; control mark reading means for reading a control mark added and inputted in advance to the magnetic recording layer, when the photographic information regarding the image frames is magnetically recorded; a printer for recording the photographic information which is read by the photographic information reading means onto the predetermined recording medium; and a printing item limiter by which, on the basis of the control mark read by the control mark reading means, the printing of any one of or both of the photographic information regarding the entire photographic film and the photographic information regarding the respective image frames is limited.

In accordance with the method described as the first aspect of the present invention, when the images are photographed on the photographic film, it is possible to record the photographic information which is common to the entire photographic film, and the photographic information relating to the respective image frames. The photographic information is recorded onto the magnetic recording layer of the photographic film. The photographic information can be recorded by selecting from the set phrases registered in advance, or by forming a user's own phrase by inputting the individual characters of the phrase one by one. However, since both the magnetic recording layer and the area (e.g., a printing area) in which the photographic information is thereafter outputted are limited, selection of one of the above-described recording methods, in the invention, causes the recording by using the other method to be prohibited. Accordingly, the amount of magnetically-recorded information can be limited.

In accordance with the apparatus described as the second aspect of the present invention, the user can freely select either the selecting/recording means or the inputting/recording means. When the user selects one of the recorder and recording is effected, the photographic information recording limiter limits the recording by the other recorder, for example, so as to be controlled completely. Accordingly, the amount of recording the photographic information can be limited and does not exceed the printing area in subsequent printing.

In a camera in which the photographic information inputting device is loaded when photographic information once inputted is printed or the like without any modifications or changes, what the user does not expect, for example, a wrong or omitted word, may appear. Therefore, the camera described as the third aspect of the present invention is provided with a memory, which stores the photographic information inputted by the photographic information inputting device, and editing means, which can freely access and edit the information from the storing means. As a result, the information which was recorded when the images were photographed can be edited. In a case in which the printing area of a recording medium is limited (i.e., the number of characters to be printed is limited), the photographic information can be modified later so that the information can be entered within the limited range.

Besides the photographic information from the above-described photographic information inputting device, photographic data when the images are photographed may be stored in the storing means. Thus, the photographic data can be added to the photographic information.

In accordance with the method described as the fourth aspect of the present invention, there can be obtained photographic information regarding the entire photographic film and the photographic information regarding the respective image frames, both of which are selected from a plurality of set phrases registered in advance and then magnetically recorded, or photographic information regarding the entire photographic film and the photographic information regarding the respective image frames, both of which are formed by the user inputting individual characters and then magnetically recorded. However, the information regarding the entire photographic film may not correspond to some of the image frames. With respect to such image frames, printing of the photographic information regarding the entire photographic film can be canceled.

Moreover, depending on a printing medium or location, there is a case in which its printing area is limited so that all of the information cannot be printed. In this case, by printing the photographic information regarding the respective image frames prior to the photographic information regarding the entire photographic film, the photographic information regarding the respective image frames can be printed at least. Alternatively, by printing the phrase which is formed by the user inputting individual characters prior to the set phrase, the information which is important to the user is given higher priority.

In accordance with the apparatus described as the fifth aspect of the present invention, the photographic information reading means reads the following photographic information (titles) from the photographic film.

A. Information relating to one negative film, selected from set phrases (a user selecting film title).

B. Information relating to one negative film, formed by inputting the individual characters of the phrase one by one (a user inputting film title).

C. Information relating to respective image frames, selected from the set phrases (a user selecting frame title).

D. Information relating to respective image frames, formed by inputting the individual characters of the phrase one by one (a user inputting frame title).

In the above-described cases C and D, a control mark may be added and inputted to the respective information. The control record reading means reads the control mark.

If possible, the printer prints all of A, B, C, and D. However, in a case in which a printing area is limited, a priority order for printing is determined on the basis of the control mark, and the printing is effected in accordance with this order.

In a case in which there is no control mark, the order D, C, B and A (with D being first and A being last) is considered to be suitable for a typical priority order. Accordingly, it suffices that the printable portions of the cases A through D are printed in accordance with the priority order. The priority order is not limited to the aforementioned order, and may be set in advance in any way the user likes.

DESCRIPTION OF THE PREFERRED EMBODIMENTS

Figure 2:
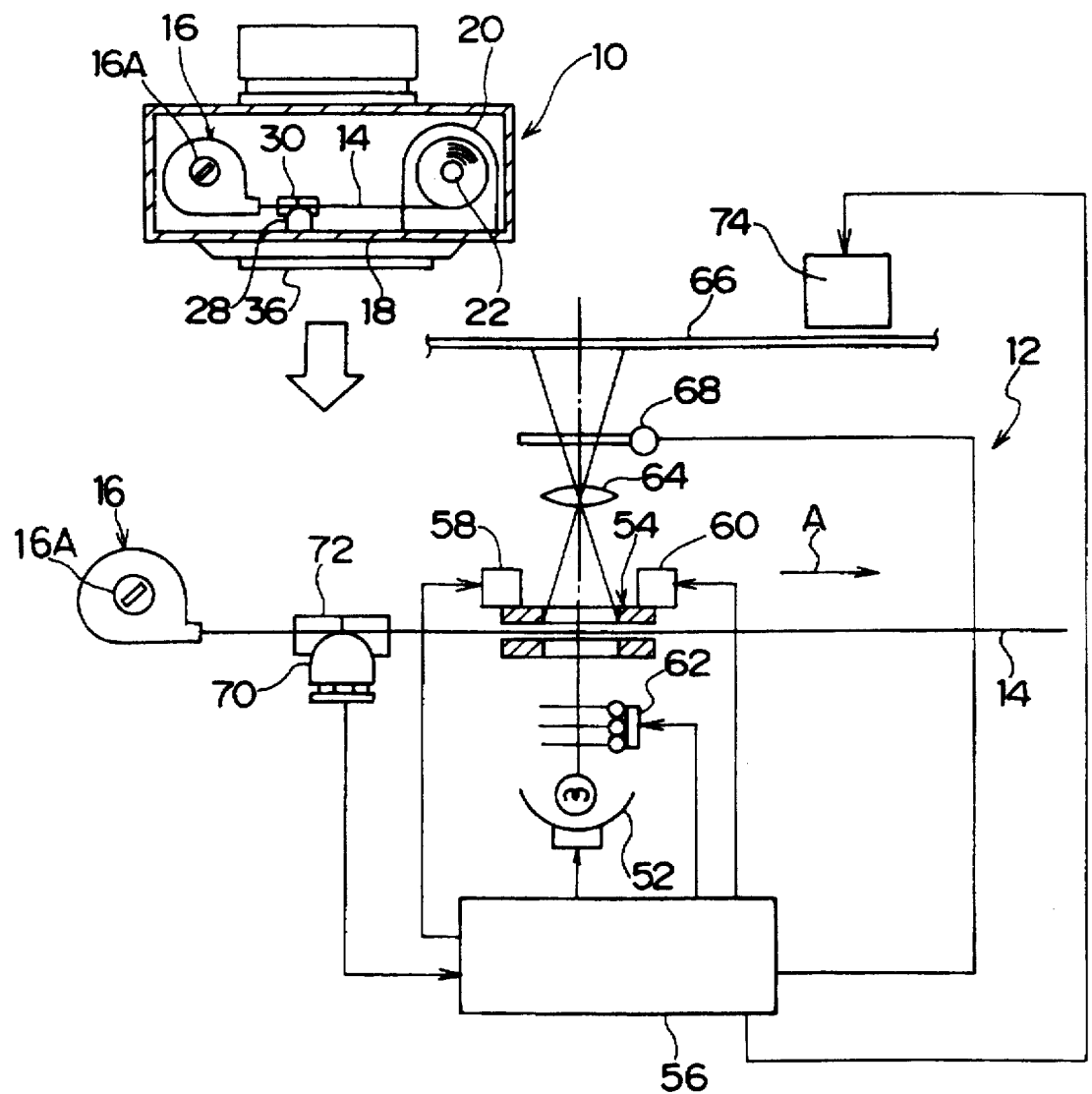
FIG. 2 is a schematic structural view of a camera and a photographic printing device relating to one embodied aspect of the present invention.

FIG. 2 shows a camera 10 and a photographic printing device 12 according to the invention. A cartridge 16 is loaded in the camera 10 at one side thereof and accommodates a negative film 14 which is taken up onto a spool 16A. A driving reel 22, which is driven by a motor 20 connected to a control portion 18, is provided at the camera 10. The leading end of the negative film is engaged with the driving reel 22 so that the frames of the negative film 14 can be forwarded.

Figure 1:
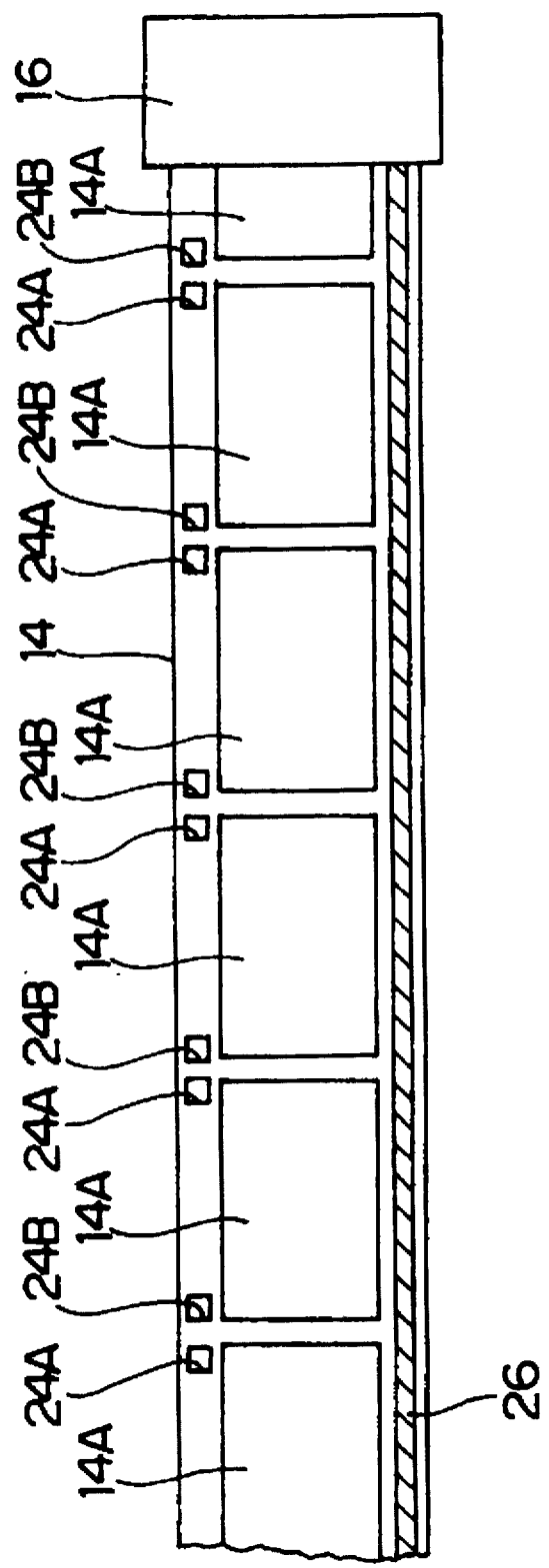
FIG. 1 is a plan view of a negative film relating to one embodied aspect of the present invention.

As shown in FIG. 1, two perforations 24A and 24B are respectively provided at one image frame 14A of the negative film 14. The perforations 24A and 24B are punched in advance at the negative film 14, and are used, for example, for positioning the film 14 when the film 14 is loaded in the above-described camera 10. Therefore, the image frame 14A is positioned by the perforations 24A and 24B so that the relative positions of the two perforations 24A and 24B and the corresponding image frame 14A always conform to each other. Moreover, the two perforations 24A and 24B are disposed at the ends of the corresponding image frame 14A in the conveying direction of the negative film 14.

In addition, a magnetic recording layer 28 is provided at the negative film 14 along the longitudinal direction thereof, at the transverse direction end portion of the negative film 14. The end portion is on the side which is opposite to the side at which the perforations 24A and 24B are provided. Various photographic information can be magnetically recorded onto the magnetic recording layer 26.

As shown in FIG. 2, a recording head 28, which corresponds to the magnetic recording layer 26 of the negative film 14 and which is connected to the control portion 18, is provided at the camera 10. When the negative film 14 is conveyed by the above-described driving means, predetermined information, which is based on the images photographed, is magnetically recorded on the above-described magnetic recording layer 26 by the recording head 28.

Further, at the conveying path of the negative film 14, two photoelectric sensors 30 are provided in the camera 10. The photoelectric sensors 30 are positioned to correspond to the path at which the above-described perforations 24A and 24B pass. A light-projecting portion and a light-receiving portion are provided as the photoelectric sensor 30 so as to be positioned at front and back surfaces of the negative film 14. In a case in which light from the above-described light-projecting portion is received by the light-receiving portion, the photoelectric sensor 30 outputs a high-level signal to the control portion 18.

The pitch between the two photoelectric sensors 30 is the same as the pitch between the two approaching perforations 24A and 24B, which are provided at the above-described negative film 14. When the negative film 14 passes between the light-projecting portion and the light-receiving portion and the two approaching perforations 24A and 24B are simultaneously detected by the photoelectric sensors 30, the recording head 28 is controlled so as to record the above-described information.

Figure 3:
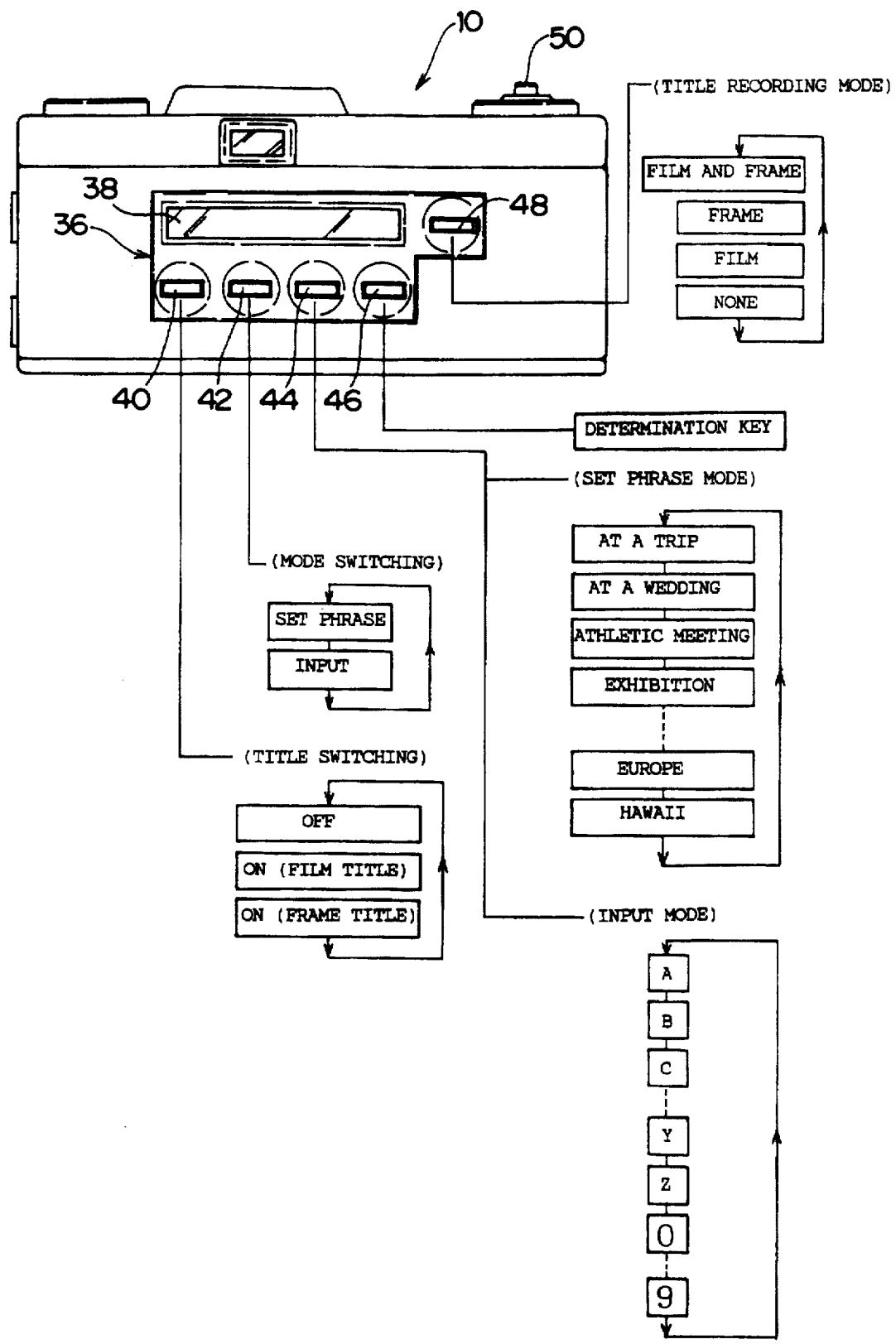
FIG. 3 is a plan view of a title inputting portion provided at a back surface of the camera relating to one embodied aspect of the present invention.

As shown in FIG. 3, an inputting portion 36 for inputting a title of the entire negative film 14 loaded in the camera 10 and titles of the respective photographed image frames 14A, is provided at the back surface side of the camera 10 of the present embodiment.

The inputting portion 36 is connected to the above-described control portion 18. The operating panel of the inputting portion 36 includes a display 38, which is elongated in the longitudinal direction of the camera 10, four operation keys 40, 42, 44, 46, which are provided at the underside of the display 38, and one operation key 48, which is provided at the right side of the display 38.

The contents inputted by the operation keys 40, 42, 44, 46, 48 are displayed on the display 38. The operation key 40, which is the first from the left, has a function to use the inputting portion 36 or not and a function to select and switch the contents of the titles. Namely, each time when the operation key 40 is operated, its key mode changes from "off", to "on (a film title)", to "on (a frame title)" and back to the "off".

The operation key 42, which is the second from the left in FIG. 3, has a mode switching function. Namely, the user selects information to be recorded as a title from set phrases stored in advance in the memory of the control portion 18, or he/she inputs individual characters one by one. Each time when the operation key 42 is operated, the mode changes from "set phrase selecting mode", to "input mode", and back to the "set phrase selecting mode"

The operation key 44, which is the third from the left in FIG. 3, has a function to select or prepare inputting content. In a case in which the set phrase mode is selected by the above-described operation key 44, the first set phrase "at a trip" is displayed on the display 38. Each time when the operation key 44 is operated from the beginning of this state, the other set phrases are successively displayed. For example, each time when the operation key 44 is operated, the title changes from "at a trip", to "at a wedding", to "athletic meeting", to "exhibition", . . . to "Europe", to "Hawaii", and back to "at a trip" and is successively displayed with the change.

The operation key 46, which is the fourth from the left in FIG. 3, is a key to determine the content displayed on the display 38. For example, the user selects the set phrase mode, and subsequently operates the operation key 46 when the "athletic meeting" is displayed. By the operation the photographic information (title) to be recorded can be determined.

On the other hand, in a case in which the "input mode" is selected by the above-described operation key 42, an alphabet "A" is displayed on the display 38. Each time when the operation key 44 is operated from the beginning of this state, the character changes from "A", to "B", to "C", . . . to "Y", to "Z", to "0", . . . to "9", and back to "A" and is successively displayed with the change. If the user operates the above-described determination key (the operation key 46) at the time when a desired character is displayed, the desired characters is inputted.

The operation key 48, which is located at the right side of the display 38 in FIG. 3, enables the user to select whether to record the inputted and registered film and frame titles, when respective images are photographed. Namely, each time when the operation key 48 is operated, its key mode changes from "film and frame", to "frame", to "film", to "none", and back to the "film and frame". Accordingly, for each image, the user can select recording of the film title, or recording of the frame title, or recording of the both titles, or recording of the neither title.

The photographic information selected by the above-described operation keys 40, 42, 44 and 46 is stored in the memory until subsequent information is inputted. Even if the operation key 40 is turned off, the information can be displayed again when the operation key 40 is turned on. Accordingly, in a case in which the user wants to correct a wrong or omitted word or he/she wants to edit the information, it suffices that the information is displayed again and the above-described input operation is repeated.

In addition, the selected photographic information may be memorized and stored together with a frame number. In order to perform this, various embodiments may be used, for example, in which a frame number input switch is provided. In the example, after the selection by the operation keys 40, 42, 44 and 46, the user's successive inputs of a frame number by using the frame number input switch permits the frame number to be stored. Even if some key is operated after the above operation, the user again inputs the frame number by using the frame number input switch, the photographic information which corresponds to the frame number can be displayed. Similarly to the aforementioned system, this system can also edit the information.

On the basis of the selected mode, when respective images are photographed, the control portion 18 controls to record the photographic information onto the magnetic recording layer 26 which corresponds to the image frame 14A.

When a shutter release button 50 is operated by a right index finger, a right thumb reaches the operation key 48. Accordingly, when respective images are photographed, the user can easily operate the operation key 48.

After the photographed negative film 14 is rewound around the cartridge 16, the film 14 is withdrawn from the camera 10, and is taken to a processing laboratory via a DPE shop ("DPE shop" refers to a place where a film is taken for processing). At the laboratory, the negative film 14 is developed and placed at a predetermined position of a photographic printing device 12.

As illustrated in FIG. 2, in the photographic printing device 12, a negative carrier 54 is disposed on the optical axis of a light source 52 for irradiation at the time of printing. The negative carrier 54 is provided with a drive roller (unillustrated), which is rotated by the driving force of a driving portion 58 connected to the controller 56. The negative film 14 is conveyed in the direction of arrow A in FIG. 2. Further, the negative carrier 54 is provided with a solenoid 60, and thus the negative film 14 can be held, pressed and fixed at the printing position by a signal from the controller 56.

Filters 62 of cyan, magenta and yellow are interposed between the light source 52 and the negative carrier 54 so that the respective filters 62 appear on the optical axis in accordance with the amount of exposure of the respective colors.

The light which has transmitted through the negative film 14 is irradiated onto a photographic printing paper 66 via a lens 64, and images are printed on the photographic printing paper 66. A shutter 68 is interposed between the photographic printing paper 66 and the lens 64, and is withdrawn from the optical axis at the time of exposure by the signal from the controller 56.

Along the conveying path of the negative film 14 and at the upper stream side of the negative carrier 54, a reading head 70 is disposed so as to read the information recorded by the recording head 28 of the above-described camera 10. The controller 56 has a memory, in which the information read by the above-described reading head 70 is memorized.

A photoelectric sensor 72 whose structure is the same as that of the photoelectric sensor 30 mounted to the above-described camera 10 is provided along the locus of transmission of the perforations 24A and 24B so as to correspond to the reading head 70. (Namely, two photoelectric sensors 72 are disposed at the same pitch as the aforementioned photoelectric sensors 30.) Accordingly, the position of the magnetic recording layer 26 can be recognized by the detection signal of the photoelectric sensor 72.

A printing head 74 is provided toward the back surface side of the photographic printing paper 66 (the upper surface side in FIG. 2). The printing head 74 allows the photographic information shown in FIG. 4 to be printed on the back surface of the photographic printing paper 66.

Figure 4:
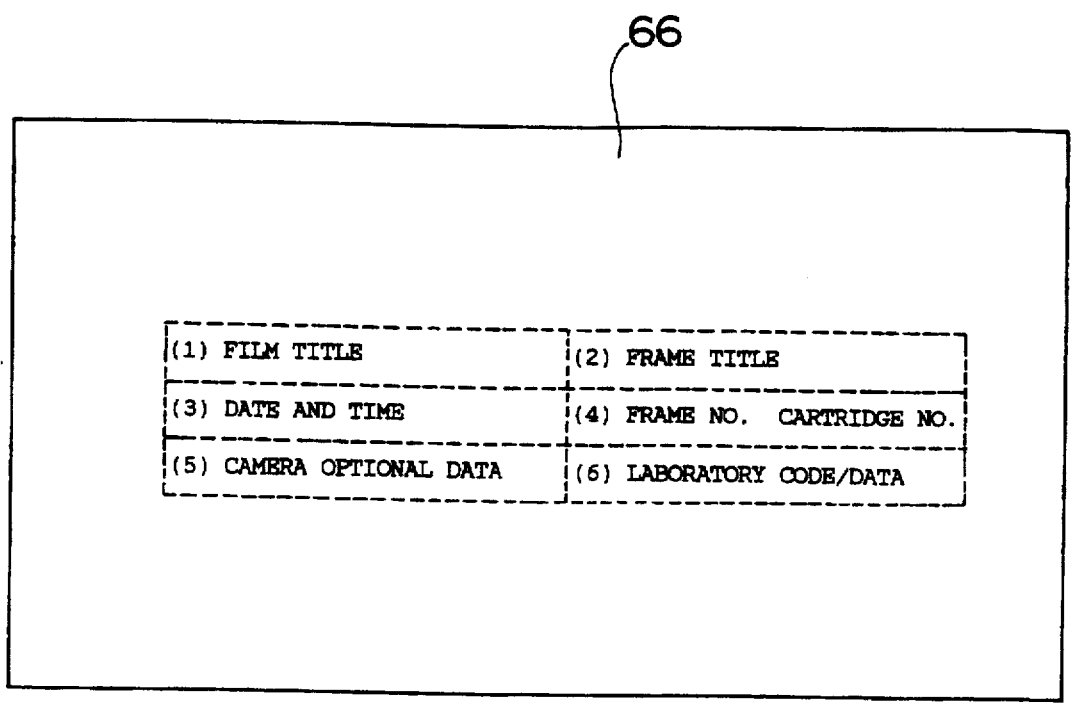
FIG. 4 is a plan view showing a printing area of a back surface of a photographic printing paper.

The respective areas in FIG. 4 are the following:

(1) is a printing area of a film title, and (2) is a printing area of a frame title. The magnetic information inputted by the above-described camera 10 is printed on the areas.

(3) is a printing area of a date and time when images are photographed. The date and time, which is automatically and magnetically recorded by the camera 10 having a dating function, is read and printed on the area.

(4) is a printing area of a frame number or cartridge number. The information recorded onto the negative film 14 (the information may be a magnetic information as described above or optical information such as a bar code or the like) is read and printed on the area.

(5) is a printing area of optional data of the camera 10. The data are read and printed on the area in a case in which a shutter speed, a value of an iris diaphragm or the like when the images are photographed is automatically and magnetically recorded.

(6) is a printing area of laboratory code/data, which can be freely printed at the processing laboratory.

The number of characters printable in the above-described printing areas is limited. For example, in a case in which a set phrase as a film title, a freely-inputted phrase as a film title, a set phrase as a frame title and a freely-inputted phrase as a frame title are recorded onto a certain camera 10, all of the phrases may not be printed.

In a case in which there is no instruction from the camera, i.e., from the user, the freely-inputted phrase is printed on the printing area prior to the set phrase. If there remains no printing area due to this, the set phrase is not printed.

Moreover, in the above-described (1) and (2), the printing area of the film title and that of the frame title are separated. However, in a case in which the number of characters of the frame title is larger than that of characters printable in the printing area of the frame title, the frame title is printed on both the printing areas prior to the film title so that the film title is not printed thereon.

Namely, the priority order is set in advance to 1) the user inputting frame title, 2) the user selecting frame title, 3) the user inputting film title, and 4) the user selecting film title. In a case in which the "film and frame" is selected by the title recording mode of the operation key 48 (a user instruction), the contents of prints are determined in accordance with the number of inputted characters and the printing areas.

The operation of the present embodiment will be explained hereinafter.

The negative film 14 is loaded in the camera 10, and a purpose of photographing images, i.e., a title of the film is inputted.

At first, the operation key 40 is operated once so that the input portion 36 is turned on and the film title input mode is set. Next, the operation key 42 is operated so as to select either the set phrase mode or the individual character input mode. For example, in a case of photographing at athletic meeting, the set phrase is selected because a set phrase called the "athletic meeting" is stored.

Next, the operation key 44 is operated so that the set phrases are displayed in turn on the display 38. The "athletic meeting" is thereby displayed. When the operation key (the determination key) 46 is operated in this state, the "athletic meeting" can be set as a film title.

If the set phrase mode is selected as described above for a film title, an embodiment of the invention prohibits to input any characters for additional information to the film title. However, an embodiment may be taken in which input of additional information per se is not prohibited, for example, in a case in which the user wants to add "primary school A". He/she operates the operation key 42 in the state in which the "athletic meeting" is displayed and selects the individual character input mode. Next, when the operation key 44 is operated to select the individual characters of "primary school A" one by one and the determination key 46 is operated in harmony with the operation of the key 46, a combination of the set phrase and the individual character inputted phrase can be formed (in the present invention, this case is included in the user inputting film title).

In a case in which the user wants to input a "tug of war" when the first image frame 14A is photographed, he/she operates the operation key 40 to select the "on (frame title)". Next, the user operates the operation key 42 to select the "input mode", and thereafter, he/she operates the operation keys 44 and 46 to determine the individual characters of the phrase one by one.

After the frame title is determined, the user selects recording of the film title and/or recording of the frame title by operation of the operation key 48.

For example, when the shutter release button is operated in a state in which the film and frame are selected, an image is exposed and simultaneously the film title "athletic meeting primary school A" and the frame title "tug of war" are recorded onto the magnetic recording layer 26 which corresponds to the image frame 14A.

When additional frame titles are needed (e.g., "relay race", "obstacle race" and the like), the above-described operations are effected to continue to photograph images.

When the areas of the negative film 14 which can be photographed are left after the athletic meeting, images may be photographed at other places. In this case, the film title is no longer needed. Therefore, the operation key 48 is operated so as to not record the film title.

When the user finishes photographing the images, he/she withdraws the negative film 14 (the cartridge 16) from the camera 10 and requests development of and prints from a DPE shop. Then, the negative film 14 is taken to a processing laboratory. At the processing laboratory, the negative film 14 is developed at first and then disposed at a predetermined position of the photographic printing device 12.

In this state, the driving portion 58 is driven by the control of the controller 56, and the negative film 14 is conveyed in the direction of arrow A in FIG. 2 by the rotation of the driving roller.

At this time, the photographic information recorded at every image frames 14A is read by the reading head 70 and is stored in the memory of the controller 56.

When the predetermined image frame 14A reaches the printing position, the solenoid 80 is driven so that the negative film 14 is held, pressed and fixed at the printing position.

In this state, the shutter 68 is opened and the respective filters 62 of cyan, magenta and yellow appear on the optical axis in accordance with the amount of exposure. Accordingly, the lights which have transmitted through the negative film 14 are irradiated onto the photographic printing paper 66 via the lens 64, and the image is printed on the photographic printing paper 66.

On the back surface side of the photographic printing paper 66 which corresponds to the printed image, the photographic information (above-described (1) through (6)) stored in the above-described memory is printed by the printing head 74.

In a case in which there is no instruction from the camera, i.e., the user, the freely-inputted phrase is printed prior to the set phrase. In a case in which there remains no printing area due to the above-described printing, the set phrase is not printed. Further, in a case in which the number of characters of the frame title is large, the frame title is printed prior to the film title, and thus the film title is not printed.

Namely, the priority order is set in advance to 1) the "user inputting frame title", 2) the "user selecting frame title", 3) the "user inputting film title", and 4) the "user selecting film title". In a case in which the "film and frame" is selected, for title-recording, by the operation key 48 (user instruction), the content of printing is determined in accordance with the number of inputted characters and printing areas.

Due to this, the frame titles which the user thinks necessary and in which the individual characters thereof have been inputted one by one for the respective image frames 14A can be given the highest priority. Therefore, even if the printing area is small and all of the photographic information cannot be printed, the minimum information necessary to print can be printed.

In a case in which there is an instruction from the user, for example, an instruction by the operation key 48 that the user wants to record only the film title, the order of printing will be different from the above-mentioned priority order. Even if the film title is a set phrase, the film title is printed prior to the frame title. Namely, since the printing is effected while the highest priority is given to the user's intention, complaint by the user after the film is returned to him/her can be minimized.

Thus, when the printing areas are limited so that all of photographic information, which is magnetically recorded onto the magnetic recording layer 26 when images are photographed, cannot be printed, determining in advance a priority order enables the user to print the content in which the user inputs with some intention prior to others.

In a case in which there is an instruction from the user, the instruction takes precedence over others. Thus, the user would think his/her demands are met.

Further, since the inputted characters are stored in the memory of the camera 10, addition, deletion, and modification can be effected later on. Therefore, even if there is a wrong or omitted word, edition can be effected easily.

In the present embodiment, the selection of printing the film title and the frame title is operated by the operation key 48. However, for example, when the frame title is inputted after placing a blank (regarded as one character in the character code) at the head, by setting the camera 10 so as to not print the film title, the operation key 48 becomes unnecessary and thus the operation can be improved.

If the camera 10 has a function to automatically record photographic data (a shutter speed, a value of iris diaphragm, and the like), the camera 10 may be modified to apply the data for a title so that the photographic data can be added at the time of editing. The function of preparing a title can be thereby improved.

What is claimed is:

1. A method of printing photographic information, comprising the steps of:

permitting, when images are photographed by using a photographic film on which a magnetic recording layer is provided, magnetic recording of photographic information regarding the entire photographic film and photographic information regarding respective image frames, by any recording method which is selected from a selecting/recording method, in which one of a plurality of set phrases registered in advance is selected and magnetically recorded, and an inputting/recording method, in which a phrase is formed by the manner which involves a user's inputting individual characters of the phrase one by one and magnetically recording; and reading the photographic information magnetically recorded and printing the photographic information on a recording medium, wherein the printing of at least one of photographic information regarding said entire photographic film and photographic information regarding said respective image frames is limited.

2. A method of printing photographic information according to claim 1, wherein the printing is effected on the back surface of the recording medium.

3. A method of printing photographic information according to claim 2, wherein in a case in which a printing area is printed on the back surface of the recording medium, said limiting is effected.

4. A method of printing photographic information according to claim 1, wherein the photographic information regarding said respective image frames is printed prior to the photographic information regarding said entire photographic film.

5. A method of printing photographic information according to claim 1, wherein the photographic information recorded by the inputting/recording method is printed prior to the photographic information recorded by the selecting/recording method.

6. A method of printing photographic information according to claim 1, wherein four types of information are recordable, including, in order of printing preference: the photographic information regarding the respective image frames which have been recorded by the inputting/recording method, the photographic information regarding the respective image frames which have been recorded by the selecting/recording method, the photographic information regarding the entire photographic film which have been recorded by the inputting/recording method, and the photographic information regarding the entire photographic film which have been recorded by the selecting/recording method.

7. A method of printing photographic information according to claim 6, wherein said four types of information are printed in accordance with the order based on the user's instruction.

8. A method of printing photographic information according to claim 6, wherein said four types of information are printed in accordance with the order based on control mark added and inputted in advance to the magnetic recording layer, when the photographic information regarding the respective image frames are magnetically recorded.

9. A method of printing photographic information according to claim 8, wherein said control mark is any one of characters, symbols and a space.

10. An apparatus for printing photographic information by which it is permitted, when images are photographed by using a photographic film at which a magnetic recording layer is provided, to record photographic information regarding the entire photographic film and photographic information regarding respective image frames, by selecting from a plurality of set phrases registered in advance and magnetically recording, and to record photographic information regarding the entire photographic film and photographic information regarding respective image frames, by the manner which involves user's inputting individual characters of the phrase one by one and magnetically recording, on a predetermined recording medium, comprising:

photographic information reading means for reading said photographic information;

control mark reading means for reading a control mark added and inputted in advance to the magnetic recording layer, when the photographic information regarding said image frames is magnetically recorded;

a printer for recording the photographic information which is read by said photographic information reading means onto said predetermined recording medium; and a printing item limiter by which, on the basis of the control mark read by said control mark reading means, the printing of any one of or both of the photographic information regarding said entire photographic film and the photographic information regarding said respective image frames is limited.

11. An apparatus for printing photographic information according to claim 10, wherein said printing item limiter prints the photographic information regarding said respective image frames prior to the photographic information regarding said entire photographic film.

12. The apparatus for printing photographic information according to claim 10, wherein said printing item limiter prints the photographic information recorded by inputting individual characters prior to the photographic information recorded by selecting set phrases.

* * * * *